United States Patent
Liu et al.

(10) Patent No.: US 11,212,827 B2
(45) Date of Patent: Dec. 28, 2021

(54) DATA TRANSMITTING METHOD, ACKNOWLEDGMENT SIGNAL TRANSMITTING METHOD, USER EQUIPMENT, AND BASE STATION

(71) Applicant: NTT DOCOMO, INC., Tokyo (JP)

(72) Inventors: Jiahui Liu, Beijing (CN); Qin Mu, Beijing (CN); Liu Liu, Beijing (CN); Naoto Okubo, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 13 days.

(21) Appl. No.: 16/637,863

(22) PCT Filed: May 24, 2018

(86) PCT No.: PCT/CN2018/088118
§ 371 (c)(1),
(2) Date: Feb. 10, 2020

(87) PCT Pub. No.: WO2019/029224
PCT Pub. Date: Feb. 14, 2019

(65) Prior Publication Data
US 2020/0252956 A1    Aug. 6, 2020

(30) Foreign Application Priority Data
Aug. 10, 2017 (CN) .......................... 201710682152.8

(51) Int. Cl.
*H04W 72/12* (2009.01)
*H04L 1/18* (2006.01)

(52) U.S. Cl.
CPC ......... *H04W 72/1289* (2013.01); *H04L 1/188* (2013.01); *H04L 1/189* (2013.01); *H04W 72/1268* (2013.01)

(58) Field of Classification Search
CPC ....... H04L 1/188; H04L 1/189; H04L 1/1883; H04W 72/1289; H04W 72/1268
See application file for complete search history.

(56) References Cited

U.S. PATENT DOCUMENTS

| | | | |
|---|---|---|---|
| 9,124,427 B2 * | 9/2015 | Ho | H04L 47/283 |
| 2013/0035084 A1 * | 2/2013 | Song | H04W 52/50 |
| | | | 455/418 |

(Continued)

*Primary Examiner* — Min Jung
(74) *Attorney, Agent, or Firm* — Osha Bergman Watanabe & Burton LLP

(57) ABSTRACT

A data transmitting method is presented for implementing early acknowledgement of receipt of uplink data and new transmission scheduling. The data transmitting method for user equipment includes: receiving scheduling information from a base station; transmitting first uplink data to the base station by an initial number of retransmissions; monitoring, in a first search space, whether a first acknowledgement signal for uplink data has been received from the base station, and meanwhile, monitoring, in a second search space, whether a second acknowledgement signal for uplink data has been received from the base station; in the case that the first acknowledgement signal has been received in the first search space, stopping retransmitting the first uplink data; and in the case that the second acknowledgment signal has been received in the second search space, stopping retransmitting the first uplink data, and starting to transmit the second uplink data to the base station.

18 Claims, 16 Drawing Sheets

(56) References Cited

U.S. PATENT DOCUMENTS

| | | | |
|---|---|---|---|
| 2017/0318566 A1* | 11/2017 | Deogun | H04L 1/1851 |
| 2018/0123765 A1* | 5/2018 | Cao | H04L 1/1896 |
| 2018/0176945 A1* | 6/2018 | Cao | H04W 72/1268 |
| 2019/0207734 A1* | 7/2019 | Yang | H04L 1/1854 |
| 2019/0208538 A1* | 7/2019 | Lee | H04L 1/1851 |
| 2020/0083991 A1* | 3/2020 | Nader | H04L 1/1864 |
| 2020/0119853 A1* | 4/2020 | Hassan Hussein | H04L 1/1858 |
| 2020/0127793 A1* | 4/2020 | Kim | H04W 4/44 |
| 2020/0163105 A1* | 5/2020 | Qu | H04W 72/0453 |
| 2020/0195383 A1* | 6/2020 | Liu | H04L 1/1671 |

\* cited by examiner

| Monitoring mode indicator bit | Monitoring mode |
|---|---|
| RV=01 | First monitoring mode |
| RV=10 | Second monitoring mode |

DATA TRANSMITTING METHOD, ACKNOWLEDGMENT SIGNAL TRANSMITTING METHOD, USER EQUIPMENT, AND BASE STATION

CROSS-REFERENCE TO RELATED APPLICATIONS

This application is a 371 U.S. National Phase of International Application No. PCT/CN2018/088118, filed on May 24, 2018, which claims priority to Chinese Application No. 201710682152.8, filed on Aug. 10, 2017. The entire disclosures of the above applications are incorporated herein by reference.

TECHNICAL FIELD

The present disclosure relates to the field of mobile communication technique, and more particularly, to a data transmitting method, an acknowledgment signal transmitting method, a user equipment, and a base station.

BACKGROUND

With the development of the mobile communication industry and the growing demand for mobile data services, people are increasingly demanding on the speed and quality of service (Qos) of mobile communication. Currently, the 5G mobile communication technology standards for network diversification, broadband, integration, and intelligence are being developed and applied. From the perspective of different information interaction objects, division of the future 5G applications will cover three types of scenarios: enhanced mobile broadband (eMBB), massive machine-type communication (mMTC) and ultra-reliable low-latency (URLLC), wherein 5G-based mMTC can be implemented by eMTC and NB-IoT evolution.

In an IoT (Internet of Things) application scenario such as eMTC, it is desirable to realize a massive connection between people and objects, as well as between objects and objects, improve network coverage and resource efficiency, and save power consumption of user equipment. In Rel-13, it is proposed to apply uplink data retransmission to improve network coverage, and it is necessary to implement early acknowledgement of uplink data reception in the IoT application scenario. In addition, according to the needs of communication, along with the early acknowledgement of the uplink data reception, it is necessary to indicate the scheduling of new uplink data transmission to the user equipment. If a conventional uplink grant signal (UL grant) is used to implement early acknowledgement and new transmission scheduling, the required signaling overhead increases, resulting in an unnecessary reduction of available resources, and also the possibility of scheduling conflicts in MPDCCH increases. If other reserved resources for MPDCCH are used (for example, physical hybrid automatic retransmission indicator channel (PHICH)), it also results in unnecessary reduction of available resources, the possibility of scheduling conflicts in MPDCCH also increases, and the existing standards are required to have major changes.

SUMMARY

In view of the above problem, the present disclosure provides a data transmitting method, an acknowledgment signal transmitting method, a user equipment, and a base station, which can realize early acknowledgement of uplink data receipt and new transmission scheduling.

According to an embodiment of the present disclosure, there is provided a data transmitting method for a user equipment, comprising: receiving scheduling information from a base station; transmitting first uplink data to the base station with an initial number of times of retransmission; monitoring whether a first acknowledgment signal for uplink data is received from the base station in a first search space, meanwhile monitoring whether a second acknowledgment signal for uplink data is received from the base station in a second search space, wherein in the case that the first acknowledgment signal is received in the first search space, retransmission of the first uplink data is stopped, and in the case that the second acknowledgment signal is received in the second search space, retransmission of the first uplink data is stopped and transmission of second uplink data to the base station is started.

According to an embodiment of the present disclosure, there is provided a data transmitting method for a user equipment, comprising: receiving scheduling information from a base station; transmitting first uplink data to the base station with an initial number of times of retransmission; monitoring whether a first acknowledgment signal or a second acknowledgment signal for uplink data is received from the base station in a search space; and in the case that the first acknowledgment signal or the second acknowledgment signal is received, stopping retransmission of the first uplink data.

According to another embodiment of the present disclosure, there is provided an acknowledgement signal transmitting method for a base station, comprising: transmitting scheduling information to a user equipment; in response to receipt of first uplink data from the user equipment, transmitting a first acknowledgment signal to the user equipment in a first search space, or transmitting a second acknowledgment signal to the user equipment in a second search space; wherein the first acknowledgment signal instructs the user equipment to stop retransmission of the first uplink data, and the second acknowledgment signal instructs the user equipment to stop retransmission of the first uplink data and to start transmission of second uplink data to the base station, a first predetermined number of times of retransmission of the first acknowledgment signal in the first search space is different from a second predetermined number of times of retransmission of the second acknowledgment signal in the second search space.

According to another embodiment of the present disclosure, there is provided an acknowledgement signal transmitting method for a base station, comprising: transmitting scheduling information to a user equipment; in response to receipt of first uplink data from the user equipment, transmitting a first acknowledgment signal to the user equipment in a first predetermined time interval, and transmitting a second acknowledgment signal to the user equipment in a second predetermined time interval, the first predetermined time interval and the second predetermined time interval do not coincide, wherein the first acknowledgment signal instructs the user equipment to stop retransmission of the first uplink data, and when a predetermined indicator bit of the second acknowledgment signal indicates a first state, the user equipment is instructed to stop retransmission of the first uplink data, and when the predetermined indicator bit indicates a second state, the user equipment is instructed to stop retransmission of the first uplink data and to start transmission of second uplink data to the base station.

According to another embodiment of the present disclosure, there is provided an acknowledgement signal transmitting method for a base station, comprising: transmitting scheduling information to a user equipment; in response to receipt of first uplink data from the user equipment, transmitting a first acknowledgment signal or a second acknowledgment signal to the user equipment based on a physical uplink shared channel resource indicated in the scheduling information or based on a predetermined monitoring mode indicator bit in the scheduling information, wherein the first acknowledgment signal instructs the user equipment to stop retransmission of the first uplink data, and the second acknowledgment signal instructs the user equipment to stop retransmission of the first uplink data and to start transmission of second uplink data to the base station.

According to another embodiment of the present disclosure, there is provided a user equipment, comprising: a receiving unit configured to receive scheduling information from a base station; a transmitting unit configured to transmit first uplink data to the base station with an initial number of times of retransmission; a monitoring unit configured to monitor whether a first acknowledgment signal for uplink data is received from the base station in a first search space, meanwhile to monitor whether a second acknowledgment signal for uplink data is received from the base station in a second search space, wherein in the case that the first acknowledgment signal is received in the first search space, the transmitting unit stops retransmission of the first uplink data, and in the case that the second acknowledgment signal is received in the second search space, the transmitting unit stops retransmission of the first uplink data and starts transmission of second uplink data to the base station.

According to another embodiment of the present disclosure, there is provided a user equipment, comprising: a receiving unit configured to receive scheduling information from a base station; a transmitting unit configured to transmit first uplink data to the base station with an initial number of times of retransmission; a monitoring unit configured to monitor whether a first acknowledgment signal or a second acknowledgment signal for uplink data is received from the base station in a search space, wherein in the case that the first acknowledgment signal or the second acknowledgment signal is received, the transmitting unit stops retransmission of the first uplink data.

According to another embodiment of the present disclosure, there is provided a base station, comprising: a transmitting unit configured to transmit scheduling information to a user equipment; a receiving unit configured to receive first uplink data from the user equipment; wherein the transmitting unit, in response to receipt of first uplink data from the user equipment, transmits a first acknowledgment signal to the user equipment in a first search space, or transmits a second acknowledgment signal to the user equipment in a second search space; wherein the first acknowledgment signal instructs the user equipment to stop retransmission of the first uplink data, and the second acknowledgment signal instructs the user equipment to stop retransmission of the first uplink data and to start transmission of second uplink data to the base station, a first predetermined number of times of retransmission of the first acknowledgment signal in the first search space is different from a second predetermined number of times of retransmission of the second acknowledgment signal in the second search space.

According to another embodiment of the present disclosure, there is provided a base station, comprising: a transmitting unit configured to transmit scheduling information to a user equipment; a receiving unit configured to receive first uplink data from the user equipment; wherein the transmitting unit, in response to receipt of first uplink data from the user equipment, transmits a first acknowledgment signal to the user equipment in a first predetermined time interval, and transmits a second acknowledgment signal to the user equipment in a second predetermined time interval, the first predetermined time interval and the second predetermined time interval do not coincide, wherein the first acknowledgment signal instructs the user equipment to stop retransmission of the first uplink data, and when a predetermined indicator bit of the second acknowledgment signal indicates a first state, the user equipment is instructed to stop retransmission of the first uplink data, and when the predetermined indicator bit indicates a second state, the user equipment is instructed to stop retransmission of the first uplink data and to start transmission of second uplink data to the base station.

According to another embodiment of the present disclosure, there is provided a base station, comprising: a transmitting unit configured to transmit scheduling information to a user equipment; a receiving unit configured to receive first uplink data from the user equipment; wherein the transmitting unit, in response to receipt of first uplink data from the user equipment, transmits a first acknowledgment signal or a second acknowledgment signal to the user equipment based on a physical uplink shared channel resource indicated in the scheduling information or based on a predetermined monitoring mode indicator bit in the scheduling information, wherein the first acknowledgment signal instructs the user equipment to stop retransmission of the first uplink data, and the second acknowledgment signal instructs the user equipment to stop retransmission of the first uplink data and to start transmission of second uplink data to the base station.

The data transmitting method, the acknowledgment signal transmitting method, the user equipment, and the base station according to the embodiments of the present disclosure introduce downlink control information (for example, a compact DCI requiring a small signaling overhead) different from the conventional uplink grant signal (UL grant) as a first acknowledgement signal indicating early acknowledgement of uplink data reception and uses a conventional uplink grant signal (UL grant) as a second acknowledgement signal indicating early acknowledgement of uplink data reception and new transmission scheduling, the user equipment is instructed to monitor the first acknowledgment signal and the second acknowledgment signal concurrently or in a time-division manner according to actual communication requirements, early acknowledgement of the uplink data receipt and flexible scheduling of new transmission are implemented with a small signaling overhead and a low power consumption of the user equipment, also there is good compatibility with the existing standards.

It is to be understood that both the foregoing general descriptions and the following detailed descriptions are exemplary and intended to provide further explanations of the claimed technique.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments, rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should fall into the protection scope of the present disclosure.

Figure 1:
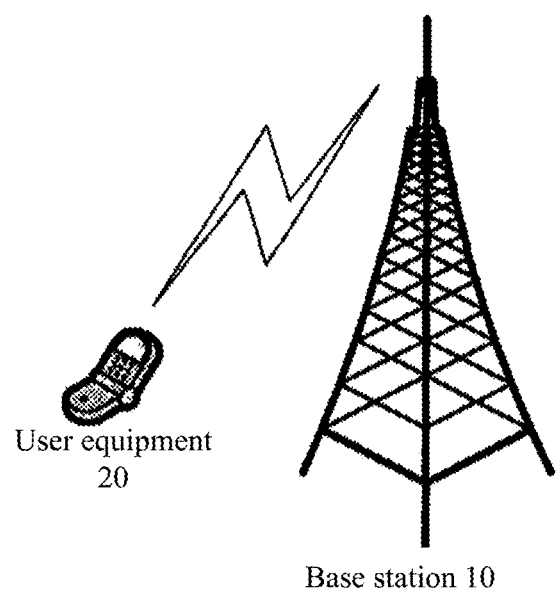
FIG. 1 is a schematic diagram outlining a communication system according to an embodiment of the present disclosure.

FIG. 1 is a schematic diagram outlining a communication system according to an embodiment of the present disclosure. As shown in FIG. 1, the communication system according to an embodiment of the present disclosure comprises a base station (eNB) 10 and a user equipment (UE) 20. The base station 10 and the user equipment 20 perform transmission and reception of communication signals based on a predetermined protocol over a predetermined communication channel.

The present disclosure can be applied to a 5G-based IoT application scenario. In order to meet the requirements of low power consumption, high resource utilization, and flexible scheduling of user equipment in this application scenario, it is desirable to implement early acknowledgement of uplink data reception and new transmission scheduling, at the same time reduce the number of times of blind decoding required for the user equipment to monitor and obtain the acknowledgment signal so as to reduce device power consumption and communication resource consumption.

First, a data transmitting method for a user equipment according to a first embodiment of the present disclosure will be described with reference to FIGS. 2, 3A and 3B. In the data transmitting method for a user equipment according to the first embodiment of the present disclosure, the user equipment concurrently monitors in its respective search space a first acknowledgment signal indicating only uplink data receipt of the base station and a second acknowledgement signal indicating both uplink data receipt of the base station and new transmission scheduling.

Figure 2:
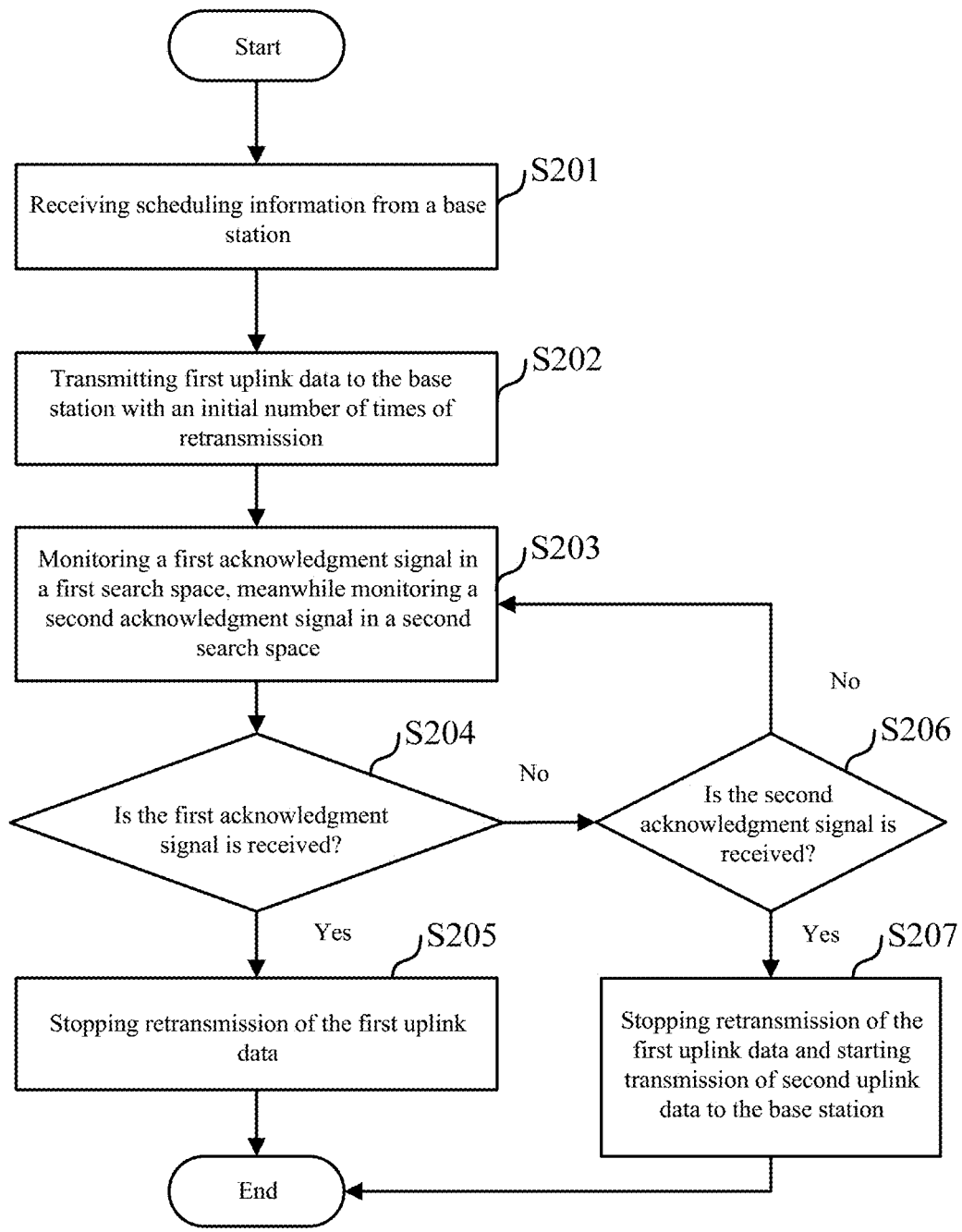
FIG. 2 is an example flowchart illustrating a data transmitting method for a user equipment according to a first embodiment of the present disclosure.

FIG. 2 is an example flowchart illustrating a data transmitting method for a user equipment according to a first embodiment of the present disclosure. Specifically, as shown in FIG. 2, the data transmitting method for a user equipment according to the first embodiment of the present disclosure comprises the following steps.

In step S201, scheduling information is received from a base station. Before a user equipment transmits uplink data to a base station, it first receives scheduling information (for example, an uplink grant signal (UL grant)) from the base station, and the base station indicates, to the user equipment, the initial number of times of uplink data retransmission in the scheduling information. Thereafter, the process proceeds to step S202.

In step S202, the user equipment transmits first uplink data to the base station with an initial number of times of retransmission. Thereafter, the process proceeds to step S203.

In step S203, a first acknowledgment signal is monitored in a first search space, meanwhile a second acknowledgment signal is monitored in a second search space. In the first embodiment of the present disclosure, subsequent to a predetermined time interval after the user equipment starts to transmit the first uplink data to the base station, the user equipment starts to monitor the first acknowledgement signal and the second acknowledgement signal. A length of the predetermined interval corresponds to the time (for example, 3 ms) required by the user equipment for channel switching and signal decoding when switching to a signal receiving channel and decoding, detecting a signal transmitted from the base station, so that the base station has sufficient time to switch to a signal corresponding to the user equipment, to decode uplink data transmitted from the user equipment, and to determine whether correct reception has been made according to a decoding result of the uplink data as well as whether further data transmission scheduling is needed, then transmits a corresponding acknowledgment signal to the user equipment.

Specifically, in the present disclosure, the first acknowledgment signal may be a compact downlink control information (compact DCI), which is only used to indicate early acknowledgement of uplink data reception. Because the first acknowledgment signal has a small number of bits, it only occupies a small amount of signaling overhead, and requires only a small number of times of retransmission of the base station to be obtained by the user equipment through blind detection. The second acknowledgment signal may be a traditional uplink grant signal (UL grant), which is used to indicate both early acknowledgement of uplink data reception and new transmission scheduling.

In an embodiment of the present disclosure, the user equipment monitors in the first search space whether a first acknowledgement signal for the uplink data is received from the base station, meanwhile monitors whether a second acknowledgment signal for the uplink data is received from the base station in a second search space. A first predetermined number of times of retransmission of the first acknowledgment signal in the first search space is different from a second predetermined number of times of retransmission of the second acknowledgment signal in the second search space. For example, for a conventional uplink grant signal, when a maximum number of times of retransmission is Rmax, its search space is composed of four types of retransmission times granularity, namely Rmax/8, Rmax/4, Rmax/2, and Rmax. In this case, the base station needs to retransmit the acknowledgment signal with four types of retransmission times granularity, and the user equipment needs to monitor all four types of retransmission times granularity accordingly. Because in the first embodiment of the present disclosure, the user equipment needs to monitor the first acknowledgment signal in the first search space and monitor the second acknowledgment signal in the second search space concurrently, if retransmission and monitoring of the first acknowledgement signal and the second acknowledgement signal are executed indiscriminately all with four types of retransmission times granularity, it will cause unnecessary signaling overhead and increase power consumption of the user equipment.

Therefore, since the number of bits of the first acknowledgment signal itself is small, the first acknowledgment signal can be obtained by the user equipment through blind detection with only a small number of times of retransmission of the base station as described above, so the first predetermined number of times of retransmission of the first acknowledgment signal in the first search space is set to be less than the second predetermined number of times of retransmission of the second acknowledgment signal in the second search space. That is, when the base station indicates early acknowledgement of uplink data reception in the form of the first acknowledgement signal, the base station makes a transmission with only two smaller retransmission times granularities (i.e., Rmax/8, Rmax/4), and the user equipment also only needs to monitor blind detection with the two smaller retransmission times granularities, then it can achieve reception of the first acknowledgement signal. It is easily understood that the present disclosure is not restricted to limiting the first acknowledgment signal to a smaller retransmission times granularity. In another embodiment of the present disclosure, the base station may be configured to make a transmission only with a larger retransmission times granularity (for example, Rmax), and the user equipment only needs to monitor blind detection with the larger retransmission times granularity, then it can achieve reception of the first acknowledgement signal.

Furthermore, in an embodiment of the present disclosure, the base station may indicate or pre-define a ratio and a position of retransmission of the first acknowledgment signal in the first search space to the user equipment via signaling. That is, the base station may notify the user equipment of search space configuration via signaling (for example, radio resource control (RRC) signaling or system information block (SIB)) according to the current communication status. For example, when the communication status is poor, the base station may notify the user equipment to increase the number of times of retransmission in the first search space, for example, using three retransmission times granularities (i.e., Rmax/8, Rmax/4, Rmax/2). In addition, the base station may flexibly configure a ratio and a position occupied by retransmission of the first acknowledgement signal in the first search space. For example, for the retransmission times of Rmax/8, its ratio and position are set as first three retransmission candidates in the time domain, the ratio is 3/8 (37.5%); for the retransmission times of Rmax/4, its ratio and position are set as first two retransmission candidates in the time domain, and the ratio is 3/8 (37.5%). In addition, a ratio and a position occupied by retransmission of the first acknowledgment signal in the first search space may also be pre-defined between a base station and a user equipment.

After that, the process proceeds to step S204.

In step S204, it is determined whether the first acknowledgment signal is received. If it is determined in step S204 that the first acknowledgment signal is received, the process proceeds to step S205.

In step S205, based on indication of the first acknowledgment signal, the user equipment stops retransmission of the first uplink data.

Conversely, if it is not determined that the first acknowledgment signal is received in step S204, the process proceeds to step S206.

In step S206, it is determined whether the second acknowledgment signal is received. If it is determined in step S206 that the second acknowledgment signal is received, the process proceeds to step S207.

In step S207, based on indication of the second acknowledgement signal, the user equipment stops retransmission of the first uplink data, and starts transmission of second uplink data to the base station based on new transmission scheduling indicated by the second acknowledgement signal.

Conversely, if it is not determined that the second acknowledgment signal is received in step S206, the process returns to step S203 in order to continue monitoring the first acknowledgment signal in the first search space, meanwhile monitoring the second acknowledgment signal in the second search space.

It should be understood that, because the user equipment monitors the first acknowledgment signal and the second acknowledgment signal concurrently, the determinations in steps S204 and S206 are performed concurrently. Once it is determined that the first acknowledgment signal or the second acknowledgment signal is received, it proceeds to step S205 or S207 to perform processing corresponding to the first acknowledgment signal or the second acknowledgment signal.

Figure 3A:
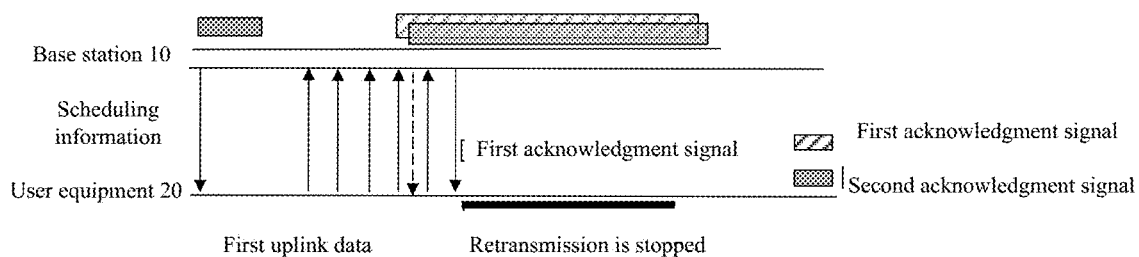
FIGS. 3A and 3B are schematic diagrams illustrating an example of a data transmitting process according to the first embodiment of the present disclosure.
Figure 3B:
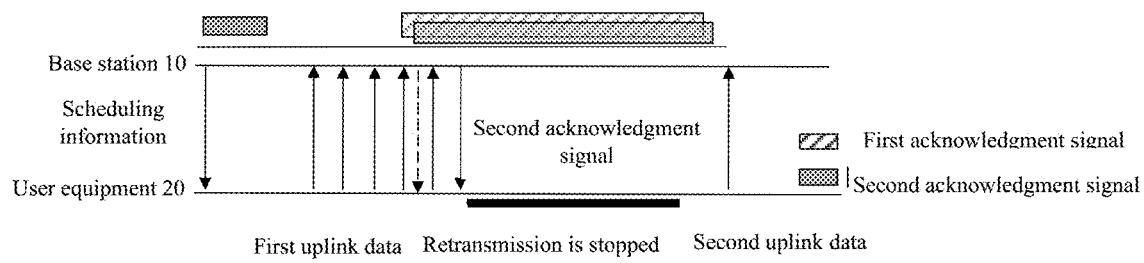

FIGS. 3A and 3B are schematic diagrams illustrating an example of a data transmitting process according to the first embodiment of the present disclosure. As shown in FIG. 3A and FIG. 3B, after receiving the scheduling information from the base station 10, the user equipment 20 transmits first uplink data to the base station 10. Thereafter, the user equipment 20 monitors the first acknowledgment signal and the second acknowledgment signal concurrently. As shown in FIG. 3A, when receiving the first acknowledgement signal, the user equipment 20 stops retransmission of the first uplink data. As shown in FIG. 3B, when receiving the second acknowledgment signal, the user equipment 20 stops retransmission of the first uplink data, and starts transmission of the second uplink data to the base station 10 according to the data transmission scheduling indicated in the second acknowledgment signal.

Next, a data transmitting method for a user equipment according to second and third embodiments of the present disclosure will be described with reference to FIGS. 4 to 11C. Unlike the data transmitting method for a user equipment according to the first embodiment of the present disclosure, in the data transmitting method for a user equipment according to the second and third embodiments of the present disclosure, the user equipment monitors only the first acknowledgment signal or the second acknowledgment signal at a certain time.

Figure 4:
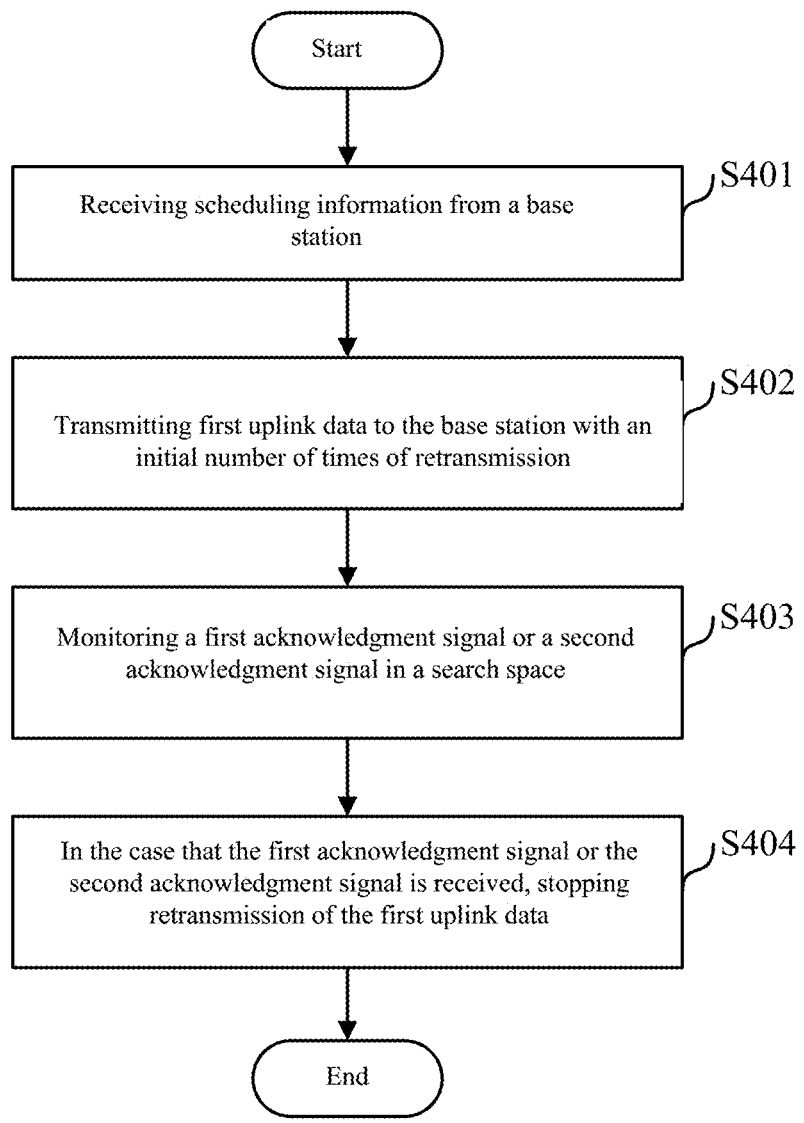
FIG. 4 is an example flowchart outlining a data transmitting method for a user equipment according to second and third embodiments of the present disclosure.

FIG. 4 is an example flowchart outlining a data transmitting method for a user equipment according to the second and third embodiments of the present disclosure. As shown in FIG. 4, the data transmitting method for a user equipment according to the second and third embodiments of the present disclosure comprises the following steps.

The processing in steps S401 and S402 is the same as steps S201 and S202 described with reference to FIG. 2, and repeated descriptions thereof are omitted here.

In step S403, the user equipment monitors a first acknowledgment signal or a second acknowledgment signal in a search space. As described in further detail below, the entire monitoring time of the user equipment can be divided into different time intervals for monitoring the first acknowledgment signal or the second acknowledgment signal separately. Alternatively, the user equipment may be explicitly or implicitly instructed to monitor the first acknowledgement signal or the second acknowledgement signal via signaling or in a resource configuration manner. Thereafter, the process proceeds to step S404.

In step S404, when the first acknowledgement signal or the second acknowledgement signal is received, retransmission of the first uplink data is stopped. As described above, the first acknowledgment signal instructs the user equipment to stop retransmission of the first uplink data. As described in detail below, the second acknowledgement signal may instruct the user equipment to stop retransmission of the first uplink data, and in addition, the second acknowledgement signal may also instruct new transmission scheduling at the same time.

Figure 5:
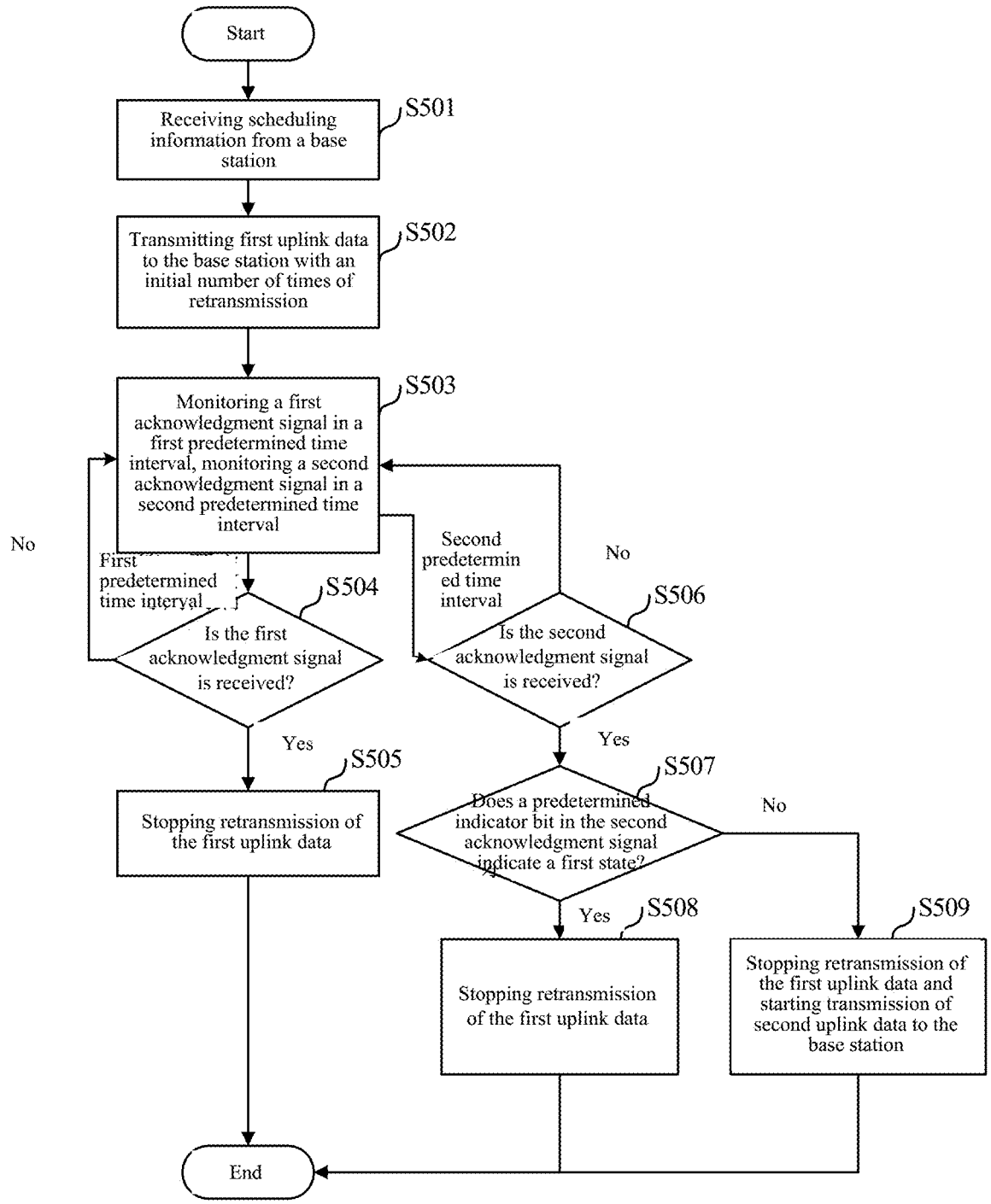
FIG. 5 is an example flowchart illustrating a data transmitting method for a user equipment according to the second embodiment of the present disclosure.

FIG. 5 is an example flowchart illustrating a data transmitting method for a user equipment according to the second embodiment of the present disclosure. In the data transmitting method for a user equipment according to the second embodiment of the present disclosure, the entire monitoring time of the user equipment is divided into different time intervals for monitoring the first acknowledgment signal or the second acknowledgment signal separately. Specifically, as shown in FIG. 5, the data transmitting method for a user equipment according to the second embodiment of the present disclosure comprises the following steps.

The processing in steps S501 and S502 is the same as steps S201 and S202 described with reference to FIG. 2, and repeated descriptions thereof are omitted here.

In step S503, the user equipment monitors the first acknowledgment signal in a first predetermined time interval, and monitors the second acknowledgment signal in a second predetermined time interval. It is monitored whether the first acknowledgment signal for uplink data is received from the base station in a first predetermined time interval, and it is monitored whether the second acknowledgment signal for uplink data is received from the base station in a second predetermined time interval, that is, making that the first predetermined time interval and the second predetermined time interval do not coincide. In the embodiment of the present disclosure, the different time intervals configured for monitoring the first acknowledgement signal or the second acknowledgement signal during the entire monitoring time of the user equipment may be defined in advance between the base station and the user equipment. Alternatively, the base station can flexibly configure the different time intervals to monitor the first acknowledgement signal or the second acknowledgement signal according to the actual communication needs and communication conditions, and notify the user equipment of a configuration result via signaling. Thereafter, the process proceeds to step S504 in the first predetermined time interval, and the process proceeds to step S506 in the second predetermined time interval.

In step S504, it is determined whether the first acknowledgment signal is received. If it is determined in step S504 that the first acknowledgment signal is received, the process proceeds to step S505.

In step S505, based on indication of the first acknowledgement signal, the user equipment stops retransmission of the first uplink data.

Conversely, if it is not determined that the first acknowledgment signal is received in step S504, the process returns to step S503 in order to continue monitoring the first acknowledgment signal in the first predetermined time interval and monitoring the second acknowledgment signal in the second predetermined time interval.

In step S506, it is determined whether the second acknowledgment signal is received. If it is determined in step S506 that the second acknowledgment signal is received, the process proceeds to step S507.

In step S507, it is determined that a predetermined indicator bit in the second acknowledgment signal indicates a first state. In the second embodiment of the present disclosure, since it has been determined in advance that the first acknowledgement signal or the second acknowledgement signal is monitored separately in a different time interval, there may be a second predetermined time interval for monitoring the second acknowledgement signal in which it only needs to acknowledge the uplink data receipt without the need to further indicate new transmission scheduling. Therefore, in order to enable the second acknowledgment signal to only indicate acknowledgment of uplink data reception (that is, to stop retransmission of uplink data whose receipt is acknowledged), a reserved bit (RA) of the second acknowledgement signal (for example, the uplink grant signal UL grant) is used to perform the indication. For example, the reserved bit RA being "11111" indicates a first state in which it only needs to stop retransmission of the uplink data; other configurations of the reserved bit RA are used to indicate a second state in which it needs to stop retransmission of uplink data and needs new transmission scheduling. For example, if there is a need for subsequent transmission scheduling, the user equipment may translate the bits of the RA in the traditional manner to obtain allocated new transmission resources. Because indication is performed by using the reserved bit of the existing acknowledgment signal, additional resource configuration and signaling overhead of the base station and user equipment are not required, and no impact on existing standards is caused.

If it is determined in step S507 that the predetermined indicator bit in the second acknowledgment signal indicates the first state, the process proceeds to step S508, and the user equipment stops retransmission of the first uplink data according to the indication.

Conversely, if it is determined in step S507 that the predetermined indicator bit in the second acknowledgment signal indicates the second state, the process proceeds to step S509, the user equipment stops retransmission of the first uplink data and starts transmission of second uplink data to the base station according to the indication.

Returning to step S506, if it is not determined that the second acknowledgment signal is received in step S506, the process returns to step S503 in order to continue monitoring the first acknowledgment signal in the first predetermined time interval and monitoring the second acknowledgment signal in the second predetermined time interval.

Figure 6:
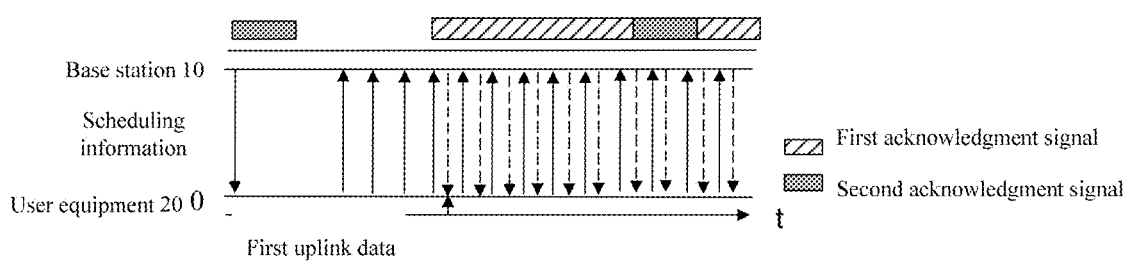
FIG. 6 is a schematic diagram illustrating an example of a data transmitting process according to the second embodiment of the present disclosure.

FIG. 6 is a schematic diagram illustrating an example of a data transmitting process according to the second embodiment of the present disclosure. As shown in FIG. 6, after receiving the scheduling information from the base station 10, the user equipment 20 transmits the first uplink data to the base station 10. Thereafter, the user equipment 20 monitors the acknowledgment signal in a time-shared manner, that is, monitoring the first acknowledgment signal in a first predetermined time interval, and monitoring the second acknowledgment signal in a second predetermined time interval.

Figure 7A:
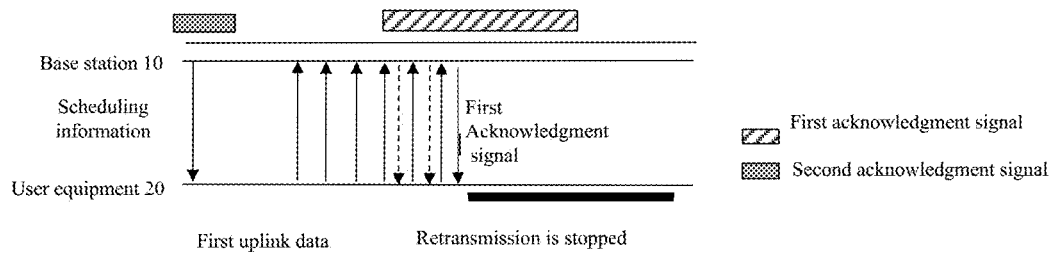
FIGS. 7A-7C are schematic diagrams further illustrating an example of a data transmitting process according to the second embodiment of the present disclosure.
Figure 7B:
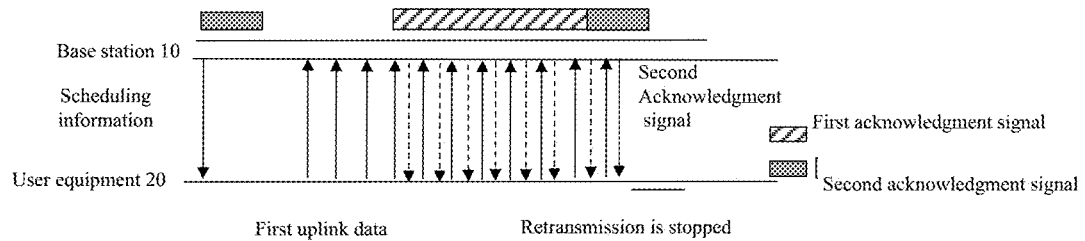
Figure 7C:
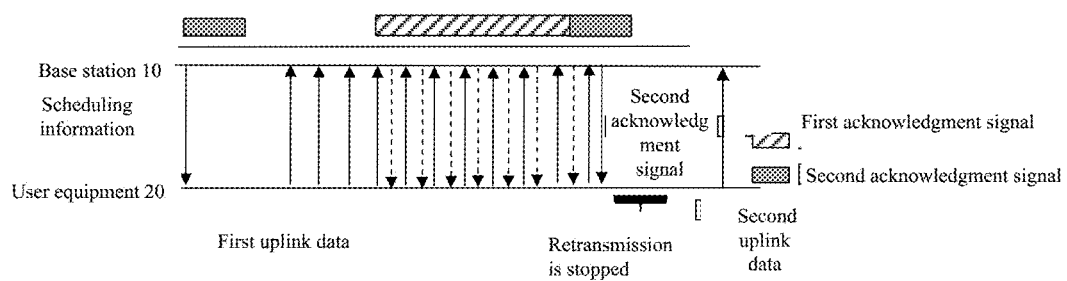

FIGS. 7A-7C are schematic diagrams further illustrating an example of a data transmitting process according to the second embodiment of the present disclosure. As shown in FIG. 7A, the user equipment 20 stops retransmission of the first uplink data when receiving the first acknowledgement signal in the first predetermined time interval. As shown in FIG. 7B, the user equipment 20 receives the second acknowledgment signal in the second predetermined time interval, the user equipment 20 further determines that the predetermined indicator bit in the second acknowledgment signal indicates a first state, thereby stops retransmission of the first uplink data. As shown in FIG. 7C, the user equipment 20 receives the second acknowledgment signal in the second predetermined time interval, the user equipment 20 further determines that the predetermined indicator bit in the second acknowledgment signal indicates a second state, thereby stops retransmission of the first uplink data and starts transmission of second uplink data to the base station.

Figure 8:
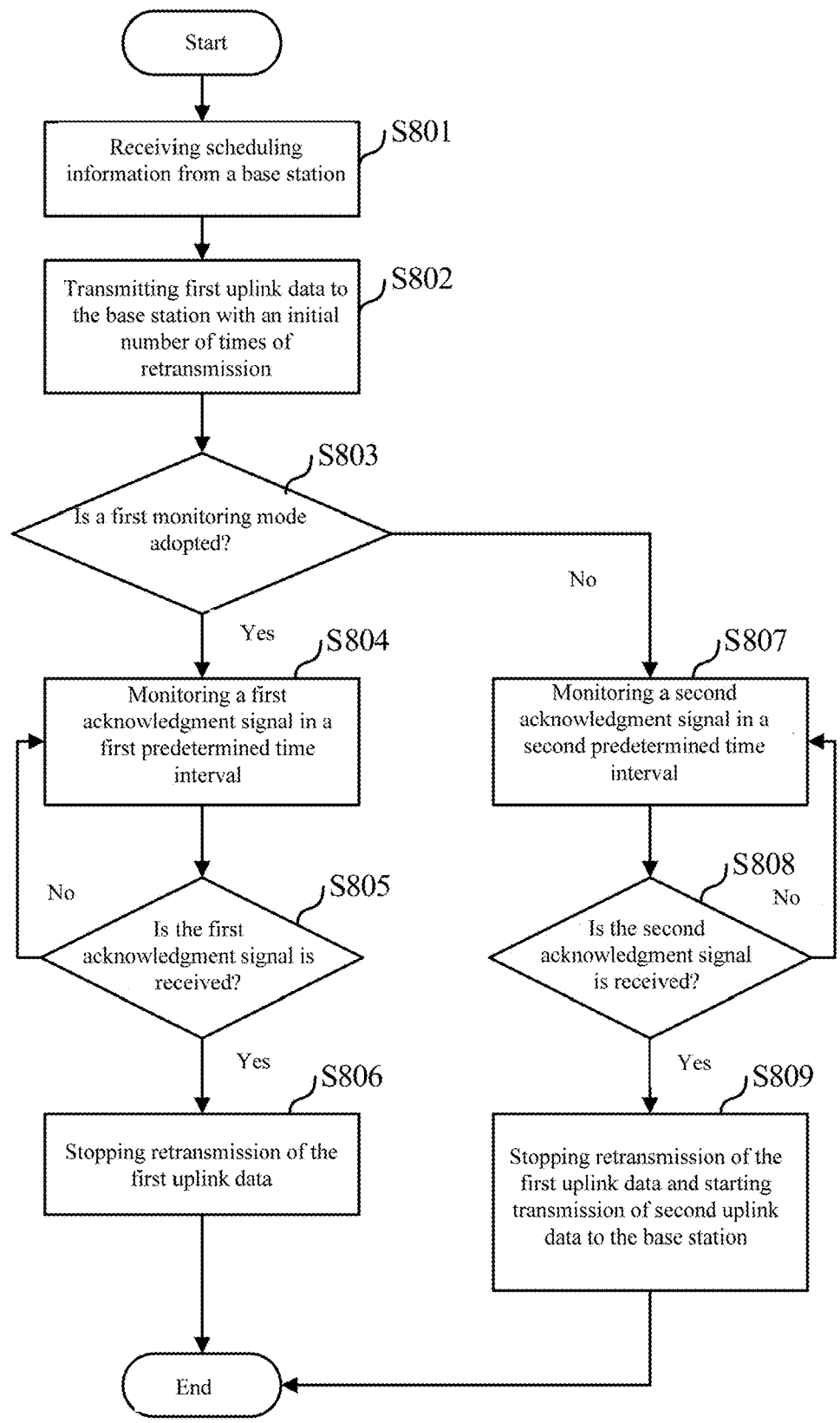
FIG. 8 is an example flowchart illustrating a data transmitting method for a user equipment according to the third embodiment of the present disclosure.

FIG. 8 is an example flowchart illustrating a data transmitting method for a user equipment according to the third embodiment of the present disclosure. In the data transmitting method for user equipment according to the third embodiment of the present disclosure, the user equipment is explicitly or implicitly instructed to monitor the first acknowledgment signal or the second acknowledgment signal during the entire monitoring time through signaling or a resource configuration. Specifically, as shown in FIG. 8, the data transmitting method for a user equipment according to the third embodiment of the present disclosure comprises the following steps.

The processing in steps S801 and S802 is the same as steps S201 and S202 described with reference to FIG. 2, and repeated descriptions thereof are omitted here.

In step S803, it is determined whether the first monitoring mode is to be adopted.

In the embodiment of the present disclosure, a resource configuration manner may be adopted to implicitly indicate the monitoring mode to be adopted to the user equipment. Alternatively, a redundant bit in the scheduling information may also be adopted to explicitly indicate the monitoring mode to be adopted to the user equipment.

Figures 9A, 9B:
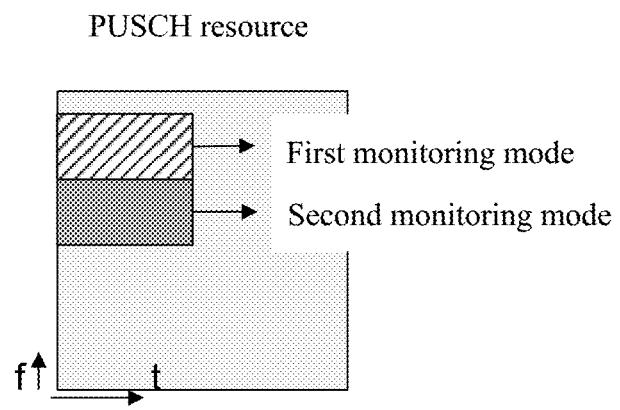
FIGS. 9A and 9B are schematic diagrams illustrating a configuration example of a monitoring mode in a data transmitting process according to the third embodiment of the present disclosure.

FIGS. 9A and 9B are schematic diagrams illustrating a configuration example of a monitoring mode in a data transmitting process according to the third embodiment of the present disclosure. As shown in FIG. 9A, a mapping relationship between a physical uplink shared channel resource and a monitoring mode (that is, a first monitoring mode corresponding to that the user equipment monitors a first acknowledgment signal and a second monitoring mode corresponding to that the user equipment monitors a second acknowledgment signal) may be pre-defined. When PUSCH adopts a first resource configuration mode, the user equipment may determine to adopt the first monitoring mode to monitor the first acknowledgement signal; when the PUSCH adopts the second resource configuration mode, the user equipment may determine to adopt the second monitoring mode to monitor the second acknowledgment signal. As shown in FIG. 9B, the monitoring mode can be directly indicated by using the monitoring mode indicator bit. The monitoring mode indicator bit is configured with a redundant bit (RV) of the scheduling information (e.g., uplink grant signal (UL grant)). When the redundant bit RV=01, the user equipment is instructed to use the first monitoring mode to monitor the first acknowledgment signal; when the redundant bit RV=10, the user equipment is instructed to use the second monitoring mode to monitor the second acknowledgment signal.

If a positive result is obtained in step S803, that is, the user equipment adopts the first monitoring mode, the process proceeds to step S804.

In step S804, the first acknowledgment signal is monitored in a predetermined time interval. Thereafter, the process proceeds to step S805.

In step S805, it is determined whether a first acknowledgment signal is received. If it is determined in step S805 that the first acknowledgment signal is received, the process proceeds to step S806.

In step S806, based on indication of the first acknowledgement signal, the user equipment stops retransmission of the first uplink data.

Conversely, if it is not determined that the first acknowledgment signal is received in step S805, the process returns to step S804 in order to continue monitoring the first acknowledgment signal.

If a negative result is obtained in step S803, that is, the user equipment adopts the second monitoring mode, the process proceeds to step S807.

In step S807, the second acknowledgment signal is monitored in a predetermined time interval. Thereafter, the process proceeds to step S808.

In step S808, it is determined whether a second acknowledgment signal is received. If it is determined in step S808 that the second acknowledgment signal is received, the process proceeds to step S809.

In step S809, based on indication of the second acknowledgement signal, the user equipment stops retransmission of the first uplink data and starts transmission of second uplink data to the base station.

Conversely, if it is not determined that the second acknowledgment signal is received in step S808, the process returns to step S807 in order to continue monitoring the second acknowledgment signal.

Figure 10:
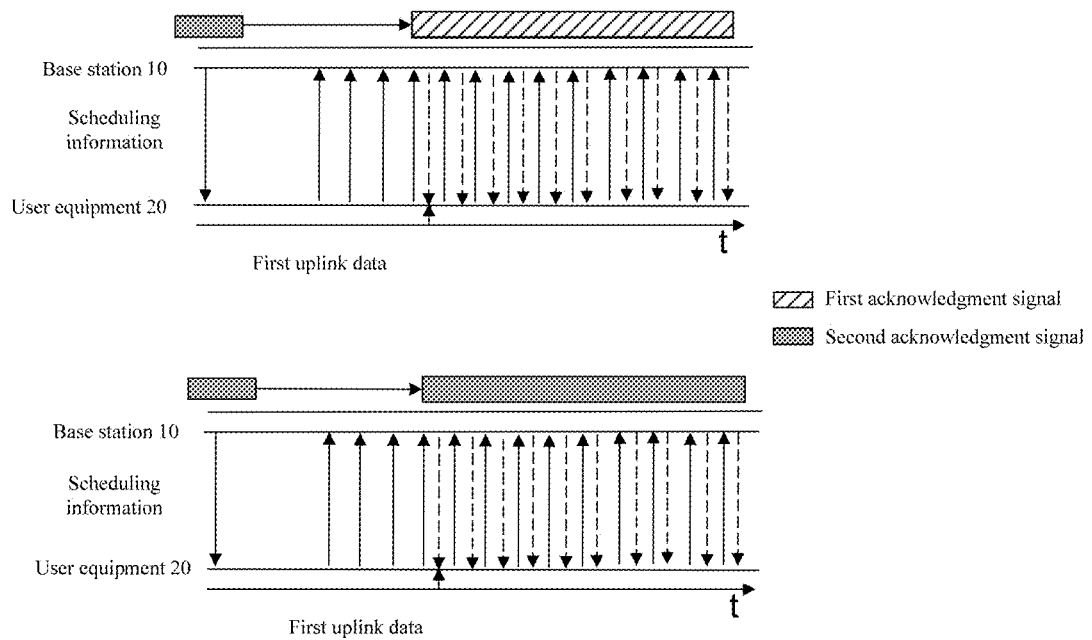
FIG. 10 is a schematic diagram illustrating an example of a data transmitting process according to the third embodiment of the present disclosure.

FIG. 10 is a schematic diagram illustrating an example of a data transmitting process according to the third embodiment of the present disclosure. As shown in FIG. 10, after receiving the scheduling information from the base station 10, the user equipment 20 transmits the first uplink data to the base station 10. Thereafter, the user equipment 20 determines which monitoring mode is to be adopted, and monitors the first acknowledgment signal or the second acknowledgment signal throughout the entire monitoring time.

Figure 11A:
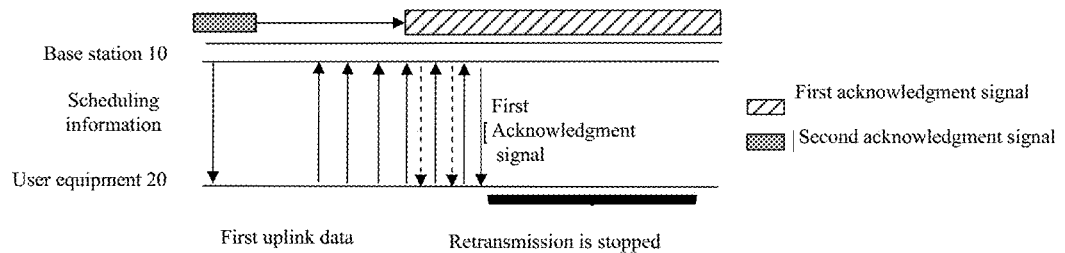
FIGS. 11A to 11C are schematic diagrams further illustrating an example of a data transmitting process according to the third embodiment of the present disclosure.
Figure 11B:
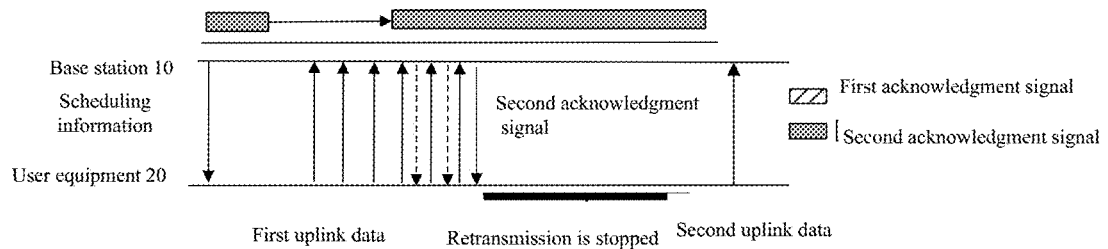
Figure 11C:
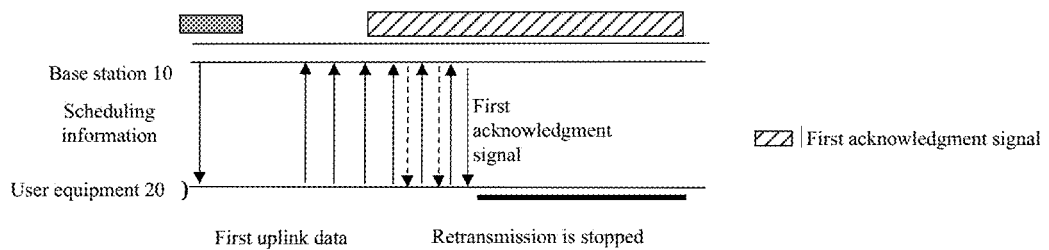

FIGS. 11A to 11C are schematic diagrams further illustrating an example of a data transmitting process according to the third embodiment of the present disclosure. As shown in FIG. 11A, when the user equipment 20 adopts the first monitoring mode, if the first acknowledgement signal is received, retransmission of the first uplink data is stopped. As shown in FIG. 11B, when the user equipment 20 adopts the second monitoring mode, if the second acknowledgement signal is received, retransmission of the first uplink data is stopped and transmission of second uplink data to the base station is started.

It should be understood that the present disclosure is not limited to explicitly or implicitly instructing the user equipment to monitor the first acknowledgment signal during the entire monitoring time by using signaling or resource configuration, instead the user equipment can be directly pre-set to monitor the first acknowledgment signal during the entire monitoring time, the first acknowledgement signal may be downlink control information (DCI) different from a conventional uplink grant signal (UL grant). FIG. 11C illustrates a data transmitting process in which the user equipment 20 directly adopts the first monitoring mode and stops retransmission of the first uplink data upon receiving the first acknowledgement signal. In this case, participation of the second acknowledgment signal is not required.

In addition, as described previously with reference to FIG. 2, in the case that the user equipment monitors only the first acknowledgement signal, the number of times of retransmission of the first acknowledgement signal can be flexibly configured. For example, the base station may set an indication to the user equipment or preset that the first acknowledgment signal is transmitted with two smaller retransmission times granularities (i.e., Rmax/8, Rmax/4), or is transmitted with only a larger retransmission times granularity (for example, Rmax). Further, a ratio and a position occupied by retransmission of the first acknowledgment signal in the first search space can also be flexibly configured. For example, the base station can set an indication to the user equipment or preset the number of times of retransmission corresponding to Rmax/8, and set its ratio and position as the first three retransmission candidates in the time domain, and the ratio is ⅜ (37.5%); for the retransmission times of Rmax/4, its ratio and position are set as first two retransmission candidates in the time domain, and the ratio is ⅜ (37.5%)). In the above, the data transmitting method for a user equipment according to the first to third embodiments of the present disclosure have been described with reference to the accompanying drawings; hereinafter, the acknowledgment signal transmitting method for a base station corresponding to the data transmitting method for a user equipment will be described with reference to the drawings.

Figure 12:
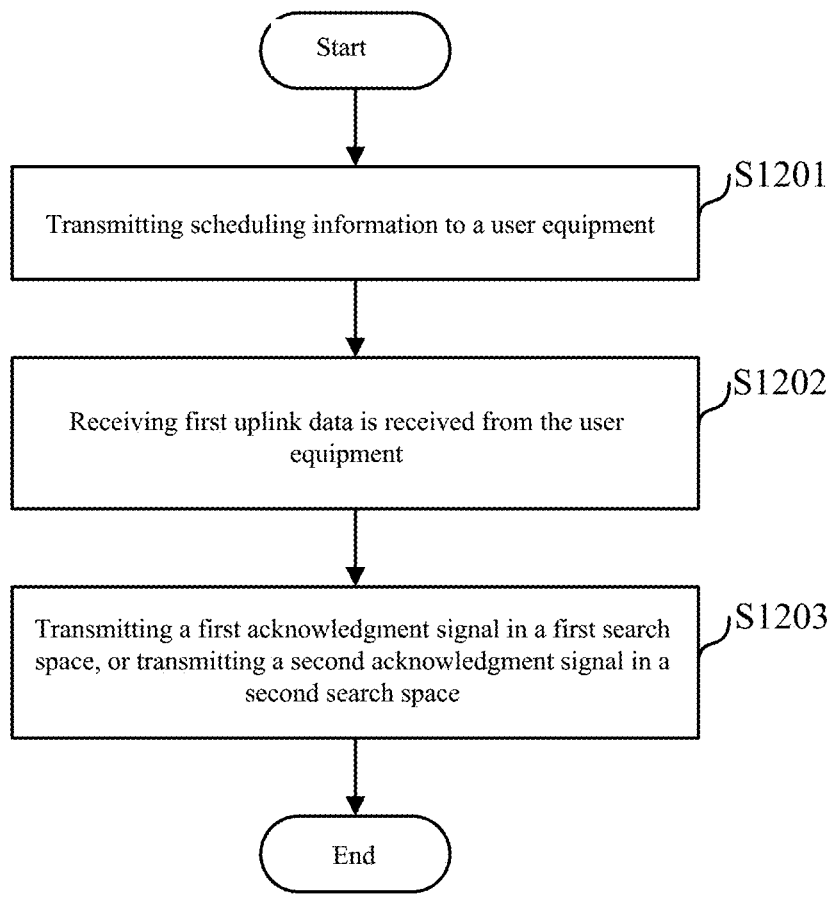
FIG. 12 is an example flowchart illustrating an acknowledgement signal transmitting method for a base station according to the first embodiment of the present disclosure.

FIG. 12 is an example flowchart illustrating an acknowledgement signal transmitting method for a base station according to the first embodiment of the present disclosure. As shown in FIG. 12, the method for transmitting an acknowledgement signal for a base station according to the first embodiment of the present disclosure comprises the following steps.

In step S1201, scheduling information is transmitted to a user equipment. As described above, the base station indicates, to the user equipment, the number of times of initial retransmission of uplink data in the scheduling information (for example, an uplink grant signal (UL grant)). Thereafter, the process proceeds to step S1202.

In step S1202, first uplink data is received from the user equipment. Thereafter, the process proceeds to step S1203.

In step S1203, the base station transmits a first acknowledgment signal in a first search space, or transmits a second acknowledgment signal in a second search space.

In the first embodiment of the present disclosure, the base station transmits a first acknowledgement signal when no further transmission scheduling is needed, and the base station transmits a second acknowledgement signal when further transmission scheduling is needed.

Figure 13:
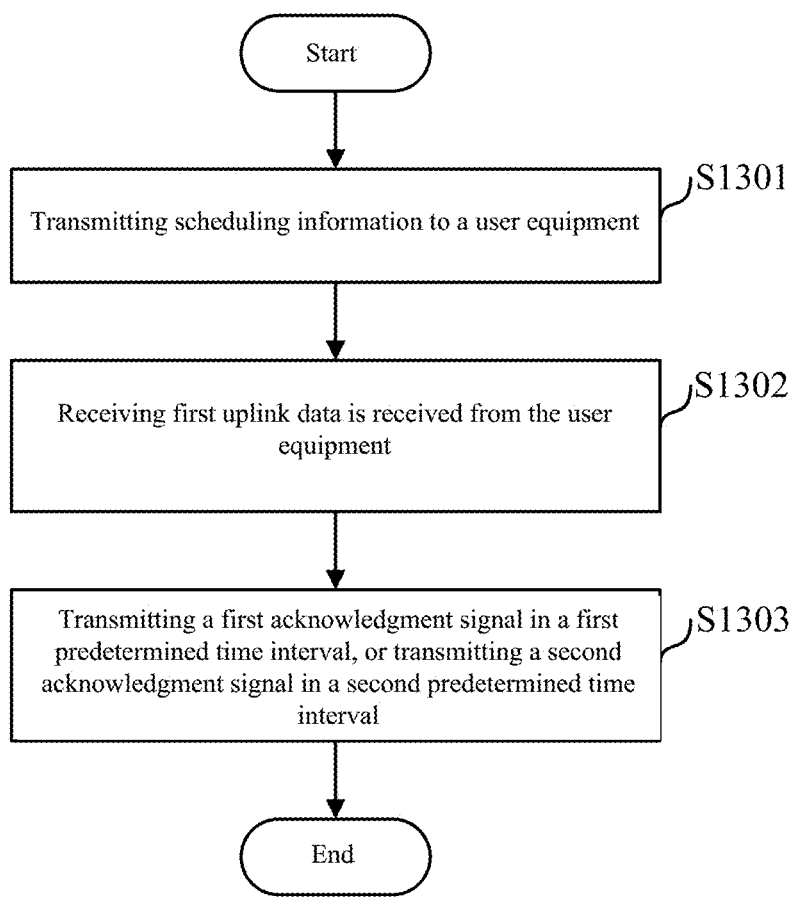
FIG. 13 is an example flowchart illustrating an acknowledgement signal transmitting method for a base station according to the second embodiment of the present disclosure.

FIG. 13 is an example flowchart illustrating an acknowledgement signal transmitting method for a base station according to the second embodiment of the present disclosure. As shown in FIG. 13, the method for transmitting an acknowledgement signal for a base station according to the second embodiment of the present disclosure comprises the following steps.

Steps S1301 and S1302 shown in FIG. 13 are the same as S1201 and S1202 described in FIG. 12, and repeated descriptions thereof are omitted here.

In step S1303, the base station transmits a first acknowledgment signal in a first predetermined time interval, and transmits a second acknowledgment signal in a second predetermined time interval.

In the second embodiment of the present disclosure, different time intervals for monitoring the first acknowledgment signal or the second acknowledgment signal may be defined between the base station and the user equipment in advance, or the base station may flexibly configure according to actual communication needs and communication conditions different time intervals to monitor the first acknowledgment signal or the second acknowledgment signal, and notify the user equipment of a configuration result via a signaling manner.

Figure 14:
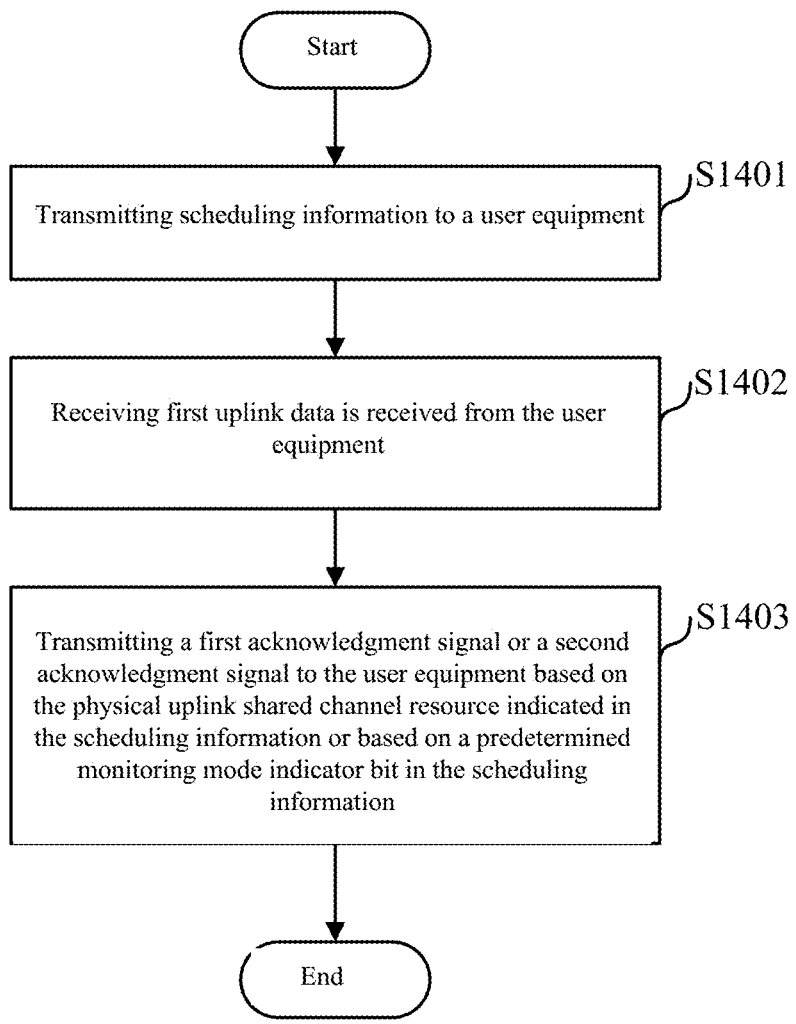
FIG. 14 is an example flowchart illustrating an acknowledgement signal transmitting method for a base station according to the third embodiment of the present disclosure.

Steps S1401 and S1402 shown in FIG. 14 are the same as S1201 and S1202 described in FIG. 12, and repeated descriptions thereof are omitted here.

In step S1403, the base station transmits a first acknowledgment signal or a second acknowledgment signal to the user equipment based on the physical uplink shared channel resource indicated in the scheduling information or based on a predetermined monitoring mode indicator bit in the scheduling information.

In the third embodiment of the present disclosure, the base station may implicitly indicate the monitoring mode to be adopted to the user equipment in a resource configuration manner. Alternatively, a redundant bit in the scheduling information may also be adopted to explicitly indicate to the user equipment the monitoring mode to be adopted. The base station transmits a first acknowledgment signal or a second acknowledgment signal to the user equipment according to the determined monitoring mode.

Next, a user equipment and a base station that perform the above-described data transmitting method and acknowledgement signal transmitting method will be further described with reference to FIGS. 15 and 16, respectively.

Figure 15:
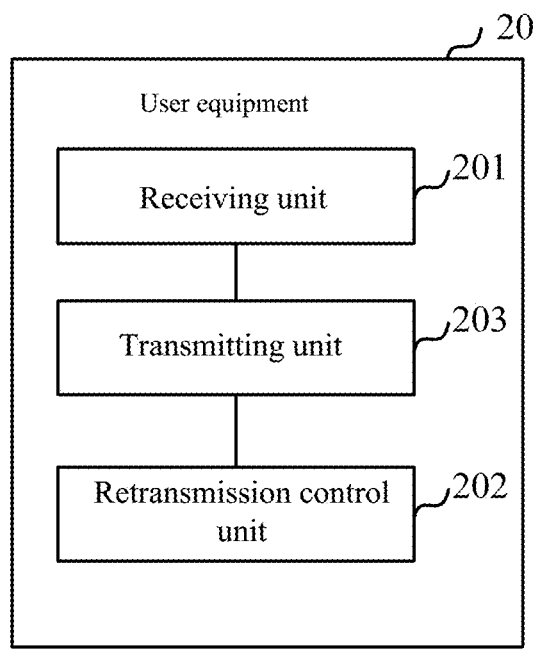
FIG. 15 is a block diagram illustrating a user equipment according to an embodiment of the present disclosure.

FIG. 15 is a block diagram illustrating a user equipment according to an embodiment of the present disclosure. As shown in FIG. 15, the user equipment 20 according to the embodiment of the present disclosure comprises a receiving unit 201, a transmitting unit 202, and a monitoring unit 203.

In the first embodiment of the present disclosure, the receiving unit 201 is configured to receive scheduling information from a base station. The transmitting unit 202 is configured to transmit first uplink data to the base station with an initial number of times of retransmission. The monitoring unit 203 is configured to monitor whether a first acknowledgment signal for uplink data is received from the base station in a first search space, meanwhile to monitor whether a second acknowledgment signal for uplink data is received from the base station in a second search space. In the case that the first acknowledgment signal is received in the first search space, the transmitting unit stops retransmission of the first uplink data, and in the case that the second acknowledgment signal is received in the second search space, the transmitting unit stops retransmission of the first uplink data and starts transmission of second uplink data to the base station.

In the second embodiment of the present disclosure, the monitoring unit 203 monitors whether a first acknowledgment signal for uplink data is received from the base station in a first predetermined time interval, and monitors whether a second acknowledgment signal for uplink data is received from the base station in a second predetermined time interval, wherein the first predetermined time interval and the second predetermined time interval do not coincide. In the case that the second acknowledgment signal is received in the second predetermined time interval, the transmitting unit 202 reads a predetermined indicator bit in the second acknowledgment signal, and when the predetermined indicator bit indicates a first state, the transmitting unit stops retransmission of the first uplink data, and when the predetermined indicator bit indicates a second state, the transmitting unit stops retransmission of the first uplink data and starts transmission of second uplink data to the base station.

In the third embodiment of the present disclosure, the monitoring unit 203 determines, based on the scheduling information, whether a first monitoring mode or a second monitoring mode is to be adopted, in the first monitoring mode it is monitored whether a first acknowledgment signal for uplink data is received from the base station in a predetermined time interval, and in the second monitoring mode it is monitored whether a second acknowledgment signal for uplink data is received from the base station, wherein in the case that the first acknowledgment signal is received, the transmitting unit 202 stops retransmission of the first uplink data, and in the case that the second acknowledgment signal is received, the transmitting unit 202 stops retransmission of the first uplink data and starts transmission of second uplink data to the base station. The monitoring unit 203 determines, according to a pre-defined mapping relationship between a physical uplink shared channel resource and the first monitoring mode and the second monitoring mode, and based on the physical uplink shared channel resource indicated in the scheduling information, to adopt the first monitoring mode or the second monitoring mode. Alternatively, the monitoring unit 203 determines, based on a predetermined monitoring mode indicator bit in the scheduling information, to adopt the first monitoring mode or the second monitoring mode.

Figure 16:
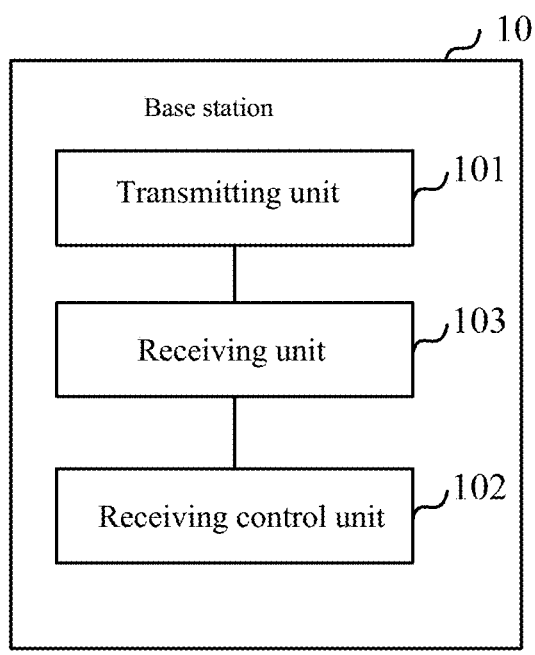
FIG. 16 is a block diagram illustrating a base station according to an embodiment of the present disclosure.
Figure 17:
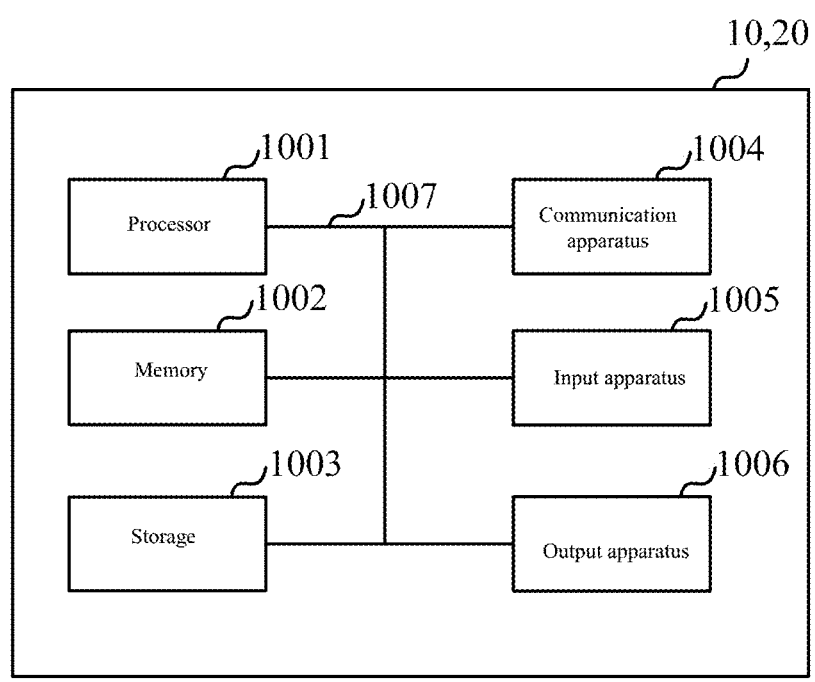
FIG. 17 is a block diagram illustrating an example of hardware configuration of a base station and a user equipment according to an embodiment of the present disclosure.

FIG. 16 is a block diagram illustrating a base station according to an embodiment of the present disclosure. As shown in FIG. 16, the base station 10 according to the embodiment of the present disclosure comprises a transmitting unit 101 and a receiving unit 102.

In the first embodiment of the present disclosure, the transmitting unit 101 is configured to transmit scheduling information to a user equipment. The receiving unit 102 is configured to receive first uplink data from the user equipment. The transmitting unit 101, in response to receipt of first uplink data from the user equipment, transmits a first acknowledgment signal to the user equipment in a first search space, or transmits a second acknowledgment signal to the user equipment in a second search space; wherein the first acknowledgment signal instructs the user equipment to stop retransmission of the first uplink data, and the second acknowledgment signal instructs the user equipment to stop retransmission of the first uplink data and to start transmission of second uplink data to the base station, a first predetermined number of times of retransmission of the first acknowledgment signal in the first search space is different from a second predetermined number of times of retransmission of the second acknowledgment signal in the second search space.

In the second embodiment of the present disclosure, the transmitting unit 101, in response to receipt of first uplink data from the user equipment, transmits a first acknowledgment signal to the user equipment in a first predetermined time interval, and transmits a second acknowledgment signal to the user equipment in a second predetermined time interval, the first predetermined time interval and the second predetermined time interval do not coincide, wherein the first acknowledgment signal instructs the user equipment to stop retransmission of the first uplink data, and when a predetermined indicator bit of the second acknowledgment signal indicates a first state, the user equipment is instructed to stop retransmission of the first uplink data, and when the predetermined indicator bit indicates a second state, the user equipment is instructed to stop retransmission of the first uplink data and to start transmission of second uplink data to the base station.

In the third embodiment of the present disclosure, the transmitting unit 101, in response to receipt of first uplink data from the user equipment, transmits a first acknowledgment signal or a second acknowledgment signal to the user equipment based on a physical uplink shared channel resource indicated in the scheduling information or based on a predetermined monitoring mode indicator bit in the scheduling information, wherein the first acknowledgment signal instructs the user equipment to stop retransmission of the first uplink data, and the second acknowledgment signal instructs the user equipment to stop retransmission of the first uplink data and to start transmission of second uplink data to the base station.

The block diagrams used in the above description of the foregoing embodiment illustrate blocks of functional units. The functional blocks (constituent elements) are realized by any combination of hardware and/or software. In addition, means for realizing each functional block is not specifically limited. That is, each functional block may be realized by one apparatus in which the functional blocks are combined physically and/or logically or may be realized by two or more apparatuses that are physically and/or logically separated by connecting the plurality of apparatuses directly and/or indirectly (for example, in a wired and/or wireless manner).

For example, the base station and the mobile station according to an embodiment of the present disclosure may function as a computer that performs processes of a wireless communication method according to the present disclosure. FIG. 16 is a block diagram illustrating an example of a hardware configuration of the base station and the mobile station according to an embodiment of the present disclosure. The base station 10 and the user equipment 20 described above may be physically configured as a computer apparatus that includes a processor 1001, a memory 1002, a storage 1003, a communication apparatus 1004, an input apparatus 1005, an output apparatus 1006, and a bus 1007 or the like.

In addition, in the following description, a term "apparatus" can be replaced with a circuit, a device, a unit, or the like. The hardware configuration of the base station 10 and the user equipment 20 may be configured to include one apparatus or a plurality of apparatuses illustrated in the drawing or may be configured not to include some of the apparatuses.

For example, the processor 1001 only illustrates one, but may be a plurality of processors. In addition, the processing may be performed by one processor, or may be performed by one or more processors simultaneously, sequentially, or by other methods. Additionally, the processor 1001 can be installed by more than one chip.

The functions of the base station 10 and the user equipment 20 are realized by the following manners: reading predetermined software (program) on hardware such as the processor 1001 or the memory 1002 so that the processor 1001 can perform an arithmetic operation and by controlling communication by the communication apparatus 1004 and reading and/or writing of data in the memory 1002 and the storage 1003.

For example, the processor 1001 controls the entire computer by operating an operating system. The processor 1001 may be also configured as a central processing unit (CPU) that includes an interface with a peripheral apparatus, a control apparatus, an arithmetic apparatus, a register, and the like. For example, the receiving control unit 103 and the retransmission control unit 203 may be realized by the processor 1001.

In addition, the processor 1001 reads a program (program codes), a software module, data and so on from the storage 1003 and/or the communication apparatus 1004 to the memory 1002 and performs various processes according to the program, the software module, or the data. As the program, a program causing a computer to perform at least some of the operations described in the foregoing embodiment is used. For example, the retransmission control unit 203 of the user equipment 20 may be stored in the memory 1002 and realized by a control program that is operated by the processor 1001. Another functional block may be similarly realized. The memory 1002 is a computer-readable recording medium and may be configured by at least one of, for example, a read-only memory (ROM), an erasable programmable ROM (EPROM), an electrically erasable programmable ROM (EEPROM), and a random access memory (RAM), and other proper storage mediums. The memory 1002 may also be referred to as a register, a cache, a main memory (main storage apparatus), or the like. The memory 1002 can store a program (program codes), a software module, or the like which can be executed to perform an information transmission method and a wireless communication method according to an embodiment of the present disclosure.

The storage 1003 is a computer-readable recording medium and may be configured by at least one of, for example, a flexible disk, a floppy (registered trademark) disk, a magneto-optical disk (for example, a Compact Disc ROM (CD-ROM), etc.), a digital versatile disc, a Blu-ray (registered trademark) disc, a removable disk, a hard disk drive, a smart card, a flash memory (for example, a card, a stick, or a key drive), a magnetic strip, a database, a server, and another appropriate medium. The storage 1003 may be also referred to as an auxiliary storage apparatus.

The communication apparatus 1004 is hardware (a transmission and reception device) that performs communication between computers via a wired and/or wireless network and is also referred to as, for example, a network device, a network controller, a network card, or a communication module. The communication apparatus 1004 may include a high frequency switch, a duplexer, a filter, a frequency synthesizer, etc., in order to implement, for example, Frequency Division Duplex (FDD) and/or Time Division Duplex (TDD). For example, the transmitting unit 101, the receiving unit 102, the receiving unit 201, and the transmitting unit 202 described above may be realized by the communication apparatus 1004.

The input apparatus 1005 is an input device (for example, a keyboard, a mouse, a microphone, a switch, a button, or a sensor) that receives an input from the outside. The output apparatus 1006 is an output device (for example, a display, a speaker, or an LED lamp) that performs an output to the outside. The input apparatus 1005 and the output apparatus 1006 may be configured to be integrated (for example, a touch panel).

In addition, the apparatuses such as the processor 1001 and the memory 1002 are connected to the bus 1007 for communicating information. The bus 1007 may be configured as a single bus or may be configured by different buses between the apparatuses.

In addition, the base station 10 and the user equipment 20 may be configured to include hardware such as a microprocessor, a digital signal processor (DSP), an application specific integrated circuit (ASIC), a programmable logic device (PLD), a field programmable gate array (FPGA), or some or all of the functional blocks may be realized by the hardware. For example, the processor 1001 may be implemented in at least one of the hardware.

The data transmitting method, the acknowledgment signal transmitting method, the user equipment, and the base station according to the embodiments of the present disclosure have been described with reference to FIGS. 1 through 17. The embodiments of the present disclosure introduce downlink control information (for example, a compact DCI requiring a small signaling overhead) different from the conventional uplink grant signal (UL grant) as a first acknowledgement signal indicating early acknowledgement of uplink data reception and uses a conventional uplink grant signal (UL grant) as a second acknowledgement signal indicating early acknowledgement of uplink data reception and new transmission scheduling, the user equipment is instructed to monitor the first acknowledgment signal and the second acknowledgment signal concurrently or in a time-division manner according to actual communication requirements, early acknowledgement of the uplink data receipt and flexible scheduling of new transmission are implemented with a small signaling overhead and a low power consumption of the user equipment, also there is good compatibility with the existing standards.

In addition, the terms described in this specification and/or terms necessary to understand this specification may be replaced with terms that have same or similar meanings. For example, a channel and/or a symbol may be a signal. In addition, a signal may be also a message. A reference signal may also be simply referred to as RS (Reference Signal), and may also be called pilot, pilot signal, etc. according to applicable standards. In addition, a component carrier (CC) may also be referred to as a cell, a frequency carrier, a carrier frequency, or the like.

In addition, the information, the parameter, or the like described in this specification may be represented by an absolute value, may be also represented by a relative value from a predetermined value, or may be also represented by another piece of corresponding information. For example, a radio resource may be indicated using an index. Further, the formula or the like using these parameters may be different from those explicitly disclosed in this specification.

The names used for the above-described parameters are not limited in any respect. For example, various channels (Physical Uplink Control Channel (PUCCH), Physical Downlink Control Channel (PDCCH), or the like) and information elements can be identified with any appropriate names, thus various names allocated to the various channels and information elements are not limited in any respect.

The information, the signal, and the like described in this specification may be represented using any of various technologies. For example, the data, the order, the command, the information, the signal, the bit, the symbol, the chip, and the like mentioned throughout the foregoing description may be represented by a voltage, a current, an electromagnetic wave, a magnetic field, or a magnetic particle, an optical field or a photon, or any combination thereof.

In addition, information or the like can be output from a higher layer to a lower layer and/or from a lower layer to a higher layer). Information or the like may be input or output via a plurality of network nodes.

The input or output information, signal, or the like may be stored in a specific location (for example, a memory) or may be managed with a management table. The input or output information, signal, or the like may be overwritten, updated, or edited. The output information, signal, or the like may be deleted. The input information, signal or the like may be transmitted to another apparatus.

The notification of information is not limited to the aspects/embodiments described in this specification and may be performed in accordance with other methods. For example, the notification of information may be performed with physical layer signaling (for example, downlink control information (DCI), uplink control information (UCI)), higher layer signaling (for example, radio resource control (RRC) signaling, broadcast information (master information block (MIB), a system information block (SIB) or the like), medium access control (MAC) signaling, or another signal, or a combination thereof.

Further, the physical layer signaling may be referred to as L1/L2 (Layer 1/Layer 2) control information (L1/L2 control signal), L1 control information (L1 control signal), and the like. In addition, the RRC signaling may be referred to as an RRC message or may be, for example, an RRC connection setup message or an RRC connection reconfiguration message. Furthermore, the MAC signaling can be notified, for example, by a MAC Control Unit (MAC CE).

In addition, notification of predetermined information (for example, notification of "ACK", "NACK") is not limited to being performed explicitly and may be performed implicitly (for example, the notification of the predetermined information is not performed, the notification of other information is performed).

Determination may be made based on a value (0 or 1) represented by 1 bit, may be made based on a true or false value (boolean value) represented by true or false, or may be made based on comparison with a numerical value (for example, comparison with a predetermined value).

Regardless of the fact that software is referred to as software, firmware, middleware, a microcode, or a hardware description language or is referred to as another name, the software is broadly interpreted to mean a command, a command set, a code, a code segment, a program code, a program, a sub-program, a software module, an application, a software application, a software package, a routine, a subroutine, an object, an executable file, an execution thread, a procedure, a function, or the like.

In addition, software, a command, information, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The terms "system" and "network" used in this specification are interchangeably used.

In this specification, the terms "base station", "wireless station", "eNB", "gNB" "cell", "sector" "cell group", "carrier", and "component carrier" can be interchangeably used in this specification. A base station can be also referred to as the term such as a fixed station, a NodeB, an eNodeB (eNB), an access point, a transmission point, a reception point, a femtocell, or a small cell.

A base station can accommodate one or more (for example, three) cells (also referred to as "sectors"). When a base station accommodates a plurality of cells, the entire coverage area of the base station can be divided into a plurality of smaller areas and a communication service can be also provided in each of the smaller areas using a base station subsystem (for example, an indoor small-sized base station remote radio head (RRH)). The term "cell" or "sector" refers to a part or all of a coverage area of a base station and/or a base station subsystem that provides a communication service in the coverage area.

In this specification, terms such as "mobile station (MS)", "user terminal", "user equipment (UE)", and "terminal" are used interchangeably. The base station is sometimes referred to by a fixed station, a NodeB, an eNodeB (eNB), an access point, a transmission point, a reception point, a femto cell, a small cell, and the like.

A mobile station is referred to as a subscriber station, a mobile unit, a subscriber unit, a radio unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

In addition, the wireless base station in this specification can also be replaced with a user terminal. For example, each mode/embodiment of the present disclosure can be applied to a configuration in which communication between a radio base station and a user terminal is replaced with communication between a plurality of user-to-device (D2D) devices. At this time, the function of the above-described wireless base station 10 can be regarded as a function of the user terminal 20. In addition, words such as "uplink" and "downlink" can also be replaced with "side". For example, the uplink channel can also be replaced with a side channel.

Similarly, the user terminal in this specification can also be replaced with a wireless base station. At this time, the function of the user terminal 20 described above can be regarded as a function of the wireless base station 10.

In this specification, a specific operation performed by the base station may be also performed by an upper node. In a network formed by one or more network nodes including a base station, it should be apparent that various operations performed for inter-terminal communicate may be performed by a base station, one or more network nodes (for example, a Mobility Management Entity (MME), a Serving-Gateway (S-GW) may be considered, but the present disclosure is not limited thereto) other than the base station, or a combination thereof.

The aspects/embodiments described in this specification may be individually used, may be combined, or may be switched during execution. In addition, the order of the process procedure, the sequence, the flowchart, or the like of each aspect/embodiment described in this specification may be interchanged unless there is contradiction. For example, in the method described in this specification, various steps have been proposed in exemplary orders and the present disclosure is not limited to the proposed specific orders.

Each aspect/embodiment described in this specification may be applied to a system in which Long Term Evolution (LTE), LTE-Advanced (LTE-A), LTE-Beyond (LTE-B), Super 3rd Generation Mobile Communication System (SUPER 3G), Advanced International Mobile Telecommunications (IMT-Advanced), 4th generation mobile communication system (4G), 5th generation mobile communication system (5G), Future Radio Access (FRA), New-RAT (Radio Access Technology), New Radio (NR), New Radio Access (NX), Future generation radio Access (FX), Global System for Mobile Communications (GSM (registered trademark)), Code Division Multiple Access 2000 (CDMA2000), Ultra Mobile Broadband (UMB), IEEE 802.11 (Wi-Fi (Registered trademark)), IEEE 802.16 (WiMAX (registered trademark)), IEEE 802.20, Ultra-WideB and (UWB), Bluetooth (registered trademark) and other appropriate systems are used and/or a next generation system extended based on the system.

The description "based on" used in this specification does not imply "based only on" unless otherwise specified. In other words, the description of "based on" implies both of "based only on" and "based at least on."

When reference is made to elements in which names "first," "second," and the like are used in this specification, the number or the order of the elements is not generally limited. The names can be used in this specification as a method to conveniently distinguish two or more elements from each other. Accordingly, reference to first and second elements does not imply that only two elements are employed or the first element is prior to the second element in some ways.

The term "determining" used in this specification may include a wide variety of operations. Regarding the "determining," for example, calculating, computing, processing, deriving, investigating, looking up (for example, looking up in a table, a database, or another data structure), and ascertaining may be considered as "determining." In addition, regarding the "determining," for example, receiving (for example, receiving information), transmitting (for example, transmitting information), inputting, outputting, and accessing (for example, accessing data in a memory) may be considered as "determining". In addition, regarding the "determining," for example, resolving, selecting, choosing, establishing, and comparing may be considered as "determining". That is, the "determining" can include a case in which any operation is "determined."

The term "connected" or "coupled" or any modification of the term means various types of direct or indirect connection or coupling between two or more elements and can include the presence of one or more intermediate elements between two mutually "connected" or "coupled" elements. The connection or the coupling between elements may be physical connection, logical connection, or any combination thereof. For example, "connection" can also be replaced with "access to". When the connection or the coupling is used in this specification, two elements can be considered to be mutually "connected" or "coupled" by using one or more electric wires, cables, and/or printed electric connection and using electromagnetic energy such as electromagnetic energy with a wavelength of a radio frequency region, a microwave region, and a light (both visible light and invisible light) region as several non-limited and non-inclusive examples.

The terms "including" and "comprising" are intended to be inclusive as in the term "comprise" as long as "including," "comprising," and modifications thereof are used in this specification or the claims. Further, the term "or" used in this specification or the claims is intended not to be exclusive OR.

The present disclosure has been described above in detail, but it is obvious to those skilled in the art that the present disclosure is not limited to the embodiments described in the specification. The present disclosure can be implemented as a modification and modification without departing from the spirit and scope of the present disclosure as defined by the appended claims. Accordingly, the description of the specification is intended to be illustrative, and is not intended to limit the present disclosure.

What is claimed is:

1. A data transmitting method for a user equipment, comprising:
   receiving scheduling information from a base station;
   transmitting first uplink data to the base station with an initial number of times of retransmission;
   monitoring whether a first acknowledgment signal or a second acknowledgment signal for uplink data is received from the base station in a search space during the retransmission and before ending of the initial number of times of retransmission; and
   in the case that the first acknowledgment signal or the second acknowledgment signal is received, stopping retransmission of the first uplink data,
   wherein monitoring whether a first acknowledgment signal or a second acknowledgment signal for uplink data is received from the base station in a search space comprises:
   monitoring whether a first acknowledgment signal for uplink data is received from the base station in a first predetermined time interval, and monitoring whether a second acknowledgment signal for uplink data is received from the base station in a second predetermined time interval,
   wherein the first predetermined time interval and the second predetermined time interval do not coincide.

2. The data transmitting method according to claim 1, wherein
   in the case that the first acknowledgment signal is received in the first predetermined time interval, retransmission of the first uplink data is stopped, and
   in the case that the second acknowledgment signal is received in the second predetermined time interval, a predetermined indicator bit in the second acknowledgment signal is read, and when the predetermined indicator bit indicates a first state, retransmission of the first uplink data is stopped, and when the predetermined indicator bit indicates a second state, retransmission of the first uplink data is stopped and transmission of second uplink data to the base station is started.

3. The data transmitting method according to claim 1, wherein monitoring whether a first acknowledgment signal or a second acknowledgment signal for uplink data is received from the base station in a search space comprises:
   determining, based on the scheduling information, whether a first monitoring mode or a second monitoring mode is to be adopted, wherein in the first monitoring mode it is monitored whether a first acknowledgment signal for uplink data is received from the base station in a predetermined time interval, and in the second monitoring mode is monitored whether a second acknowledgment signal for uplink data is received from the base station,
   wherein in the case that the first acknowledgment signal is received, retransmission of the first uplink data is stopped, and in the case that the second acknowledgment signal is received, retransmission of the first uplink data is stopped and transmission of second uplink data to the base station is started.

4. The data transmitting method according to claim 3, wherein determining, based on the scheduling information, whether a first monitoring mode or a second monitoring mode is to be adopted comprises:
   pre-defining a mapping relationship between a physical uplink shared channel resource and the first monitoring mode and the second monitoring mode; and
   determining, based on the physical uplink shared channel resource indicated in the scheduling information, to adopt the first monitoring mode or the second monitoring mode.

5. The data transmitting method according to claim 3, wherein determining, based on the scheduling information, whether a first monitoring mode or a second monitoring mode is to be adopted comprises:
   determining, based on a predetermined monitoring mode indicator bit in the scheduling information, to adopt the first monitoring mode or the second monitoring mode.

6. The data transmitting method according to claim 1, wherein monitoring whether a first acknowledgment signal or a second acknowledgment signal for uplink data is received from the base station in a search space further comprises:
   monitoring whether a first acknowledgment signal for uplink data is received from the base station in a first search space, meanwhile monitoring whether a second acknowledgment signal for uplink data is received from the base station in a second search space,
   wherein in the case that the first acknowledgment signal is received in the first search space, retransmission of the first uplink data is stopped, and
   in the case that the second acknowledgment signal is received in the second search space, retransmission of the first uplink data is stopped and transmission of second uplink data to the base station is started,
   wherein the first search space is different from the second search space.

7. The data transmitting method according to claim 6, wherein a first predetermined number of times of retransmission of the first acknowledgment signal in the first search space is different from a second predetermined number of times of retransmission of the second acknowledgment signal in the second search space.

8. The data transmitting method according to claim 7, further comprising:
   indicating or pre-defining a ratio and a position of retransmission of the first acknowledgment signal in the first search space to the user equipment via signaling.

9. A user equipment, comprising:
   a receiving unit configured to receive scheduling information from a base station;
   a transmitting unit configured to transmit first uplink data to the base station with an initial number of times of retransmission;
   a monitoring unit configured to monitor whether a first acknowledgment signal or a second acknowledgment signal for uplink data is received from the base station in a search space during the retransmission and before ending of the initial number of times of retransmission,
   wherein in the case that the first acknowledgment signal or the second acknowledgment signal is received, the transmitting unit stops retransmission of the first uplink data,
   wherein the monitoring unit monitors whether a first acknowledgment signal for uplink data is received from the base station in a first predetermined time interval, and monitors whether a second acknowledgment signal for uplink data is received from the base station in a second predetermined time interval,
   wherein the first predetermined time interval and the second predetermined time interval do not coincide.

10. The user equipment according to claim 9, wherein in the case that the second acknowledgment signal is received in the second predetermined time interval, the transmitting unit reads a predetermined indicator bit in the second acknowledgment signal, and when the predetermined indicator bit indicates a first state, the transmitting unit stops retransmission of the first uplink data, and when the predetermined indicator bit indicates a second state, the transmitting unit stops retransmission of the first uplink data and starts transmission of second uplink data to the base station.

11. The user equipment according to claim 9,
   wherein the monitoring unit determines, based on the scheduling information, whether a first monitoring mode or a second monitoring mode is to be adopted, wherein in the first monitoring mode it is monitored whether a first acknowledgment signal for uplink data is received from the base station in a predetermined time interval, and in the second monitoring mode it is monitored whether a second acknowledgment signal for uplink data is received from the base station,
   wherein in the case that the first acknowledgment signal is received, the transmitting unit stops retransmission of the first uplink data, and in the case that the second acknowledgment signal is received, the transmitting unit stops retransmission of the first uplink data and starts transmission of second uplink data to the base station.

12. The user equipment according to claim 11, wherein the monitoring unit determines, according to a pre-defined mapping relationship between a physical uplink shared channel resource and the first monitoring mode and the second monitoring mode, and based on the physical uplink shared channel resource indicated in the scheduling information, to adopt the first monitoring mode or the second monitoring mode.

13. The user equipment according to claim 11, wherein the monitoring unit determines, based on a predetermined monitoring mode indicator bit in the scheduling information, to adopt the first monitoring mode or the second monitoring mode.

14. The user equipment according to claim 9, wherein the monitoring unit is configured to monitor whether a first acknowledgment signal for uplink data is received from the base station in a first search space, meanwhile to monitor whether a second acknowledgment signal for uplink data is received from the base station in a second search space,
   wherein in the case that the first acknowledgment signal is received in the first search space, the transmitting unit stops retransmission of the first uplink data, and
   in the case that the second acknowledgment signal is received in the second search space, the transmitting unit stops retransmission of the first uplink data and starts transmission of second uplink data to the base station.

15. The user equipment according to claim 14, wherein a first predetermined number of times of retransmission of the first acknowledgment signal in the first search space is different from a second predetermined number of times of retransmission of the second acknowledgment signal in the second search space.

16. The user equipment according to claim 15, wherein the transmitting unit transmits a signaling to the user equipment to indicate a ratio and a position of retransmission of the first acknowledgment signal in the first search space, or to pre-define a ratio and a position of retransmission of the first acknowledgment signal in the first search space.

17. A base station, comprising:
   a transmitting unit configured to transmit scheduling information to a user equipment;
   a receiving unit configured to receive first uplink data from the user equipment;
   wherein the transmitting unit, in response to receipt of first uplink data from the user equipment, transmits a first acknowledgment signal to the user equipment in a first search space, or transmits a second acknowledgment signal to the user equipment in a second search space;
   wherein the first acknowledgment signal instructs the user equipment to stop retransmission of the first uplink data, and the second acknowledgment signal instructs the user equipment to stop retransmission of the first uplink data and to start transmission of second uplink data to the base station,
   a first predetermined number of times of retransmission of the first acknowledgment signal in the first search space is different from a second predetermined number of times of retransmission of the second acknowledgment signal in the second search space,
   wherein the first search space is different from the second search space.

18. The base station according to claim 17,
   wherein the transmitting unit, in response to receipt of first uplink data from the user equipment, transmits a first acknowledgment signal to the user equipment in a first predetermined time interval, and transmits a second acknowledgment signal to the user equipment in a second predetermined time interval, the first predetermined time interval and the second predetermined time interval do not coincide,
   wherein the first acknowledgment signal instructs the user equipment to stop retransmission of the first uplink data, and when a predetermined indicator bit of the second acknowledgment signal indicates a first state, the user equipment is instructed to stop retransmission of the first uplink data, and when the predetermined indicator bit indicates a second state, the user equipment is instructed to stop retransmission of the first uplink data and to start transmission of second uplink data to the base station, or
   wherein the transmitting unit, in response to receipt of first uplink data from the user equipment, transmits a first acknowledgment signal or a second acknowledgment signal to the user equipment based on a physical uplink shared channel resource indicated in the scheduling information or based on a predetermined monitoring mode indicator bit in the scheduling information,
   wherein the first acknowledgment signal instructs the user equipment to stop retransmission of the first uplink data, and the second acknowledgment signal instructs the user equipment to stop retransmission of the first uplink data and to start transmission of second uplink data to the base station.

* * * * *